(12) United States Patent
Iwamoto et al.

(10) Patent No.: US 11,009,746 B2
(45) Date of Patent: May 18, 2021

(54) BACKLIGHT DEVICE AND LIQUID CRYSTAL DISPLAY APPARATUS

(71) Applicant: SHARP KABUSHIKI KAISHA, Sakai (JP)

(72) Inventors: Kenichi Iwamoto, Sakai (JP); Mayumi Hori, Sakai (JP); Satsuki Kawai, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/073,940

(22) Filed: Oct. 19, 2020

(65) Prior Publication Data

US 2021/0116751 A1    Apr. 22, 2021

(30) Foreign Application Priority Data

Oct. 21, 2019    (JP) .............................. JP2019-192226

(51) Int. Cl.
| G02F 1/13357 | (2006.01) |
| H05B 45/325 | (2020.01) |
| C09K 11/61 | (2006.01) |
| C09K 11/08 | (2006.01) |
| C09K 11/64 | (2006.01) |
| G02F 1/1335 | (2006.01) |

(52) U.S. Cl.
CPC .... *G02F 1/133603* (2013.01); *C09K 11/0883* (2013.01); *C09K 11/617* (2013.01); *C09K 11/646* (2013.01); *H05B 45/325* (2020.01); *G02F 1/133612* (2021.01); *G02F 1/133614* (2021.01); *G02F 2202/36* (2013.01)

(58) Field of Classification Search
CPC ......... G02F 1/133603; G02F 1/133614; G02F 2202/36
USPC ........................................................... 362/84
See application file for complete search history.

(56) References Cited

U.S. PATENT DOCUMENTS 9,535,282 B1 *  1/2017  Stuppi ............... G02F 1/133553
9,736,900 B1 *  8/2017  Stuppi ....................... F21V 9/32
(Continued)

FOREIGN PATENT DOCUMENTS

JP      2017-084761 A      5/2017

OTHER PUBLICATIONS

Jian Chen et al., "Quantum Dots: Optimizing LCD Systems to Achieve Rec. 2020 Color Performance", SID 2015 Digest, 2015, pp. 173-175.

*Primary Examiner* — Christopher M Raabe
(74) *Attorney, Agent, or Firm* — ScienBiziP, P.C.

(57) ABSTRACT

A backlight device includes an LED substrate including LED devices arrayed and a quantum dot layer disposed to receive light output from the LED devices. Each LED device emits first blue light and at least one of first green light and first red light, and when relative radiance of the first blue light is 1.00, relative radiance of the first green light is 0.21 or less and relative radiance of the first red light is 0.48 or less. The quantum dot layer includes, in accordance with the at least one of the first green light and the first red light, at least one of a green quantum dot excited by the first blue light and emitting second green light and a red green quantum dot excited by the first blue light and emitting second red light, and the quantum dot layer contains 300 ppm or less of cadmium.

13 Claims, 2 Drawing Sheets

(56) References Cited

U.S. PATENT DOCUMENTS

| | | | |
|---|---|---|---|
| 2011/0241044 A1* | 10/2011 | Jang | C09K 11/02 |
| | | | 257/98 |
| 2014/0168576 A1* | 6/2014 | Lee | G02F 1/3556 |
| | | | 349/71 |
| 2017/0059129 A1* | 3/2017 | Li | G02F 1/133609 |
| 2018/0292712 A1 | 10/2018 | Kishimoto et al. | |
| 2019/0369441 A1 | 12/2019 | Kishimoto et al. | |

* cited by examiner

BACKLIGHT DEVICE AND LIQUID CRYSTAL DISPLAY APPARATUS

BACKGROUND

1. Field

The present disclosure relates to a backlight device suitably used for, for example, a liquid crystal display apparatus, and a liquid crystal display apparatus that includes the backlight device.

2. Description of the Related Art

Liquid crystal display apparatuses that ensure a wide color gamut by using quantum dots have been available on the market. A quantum dot (hereinafter, abbreviated as "QD" in some cases) is a semiconductor fine particle, emits light having a wavelength according to a particle diameter, and has a narrow half-value width of an emission spectrum. By using a blue LED that emits blue light, a quantum dot (green quantum dot, which may be referred to as G-QD) that emits green light, and a quantum dot (red quantum dot, which may be referred to as R-QD) that emits red light, a color gamut of 90% or more of the Rec. 2020 color gamut is able to be achieved. Note that, since quantum dots have low heat resistance, a remote phosphor system in which the quantum dots are disposed at a distance from the blue LED that is an excitation light source for the quantum dots is adopted (refer to Japanese Unexamined Patent Application Publication No. 2017-84761). Moreover, quantum dots are used as, for example, a QD sheet in which the G-QDs and the R-QDs are dispersed in a resin material.

As LED backlights for liquid crystal display apparatuses according to the related art, white LED devices in which a blue LED and a phosphor are used in combination are used. The white LED devices are roughly classified into a general-purpose type in which a blue LED chip that emits blue light and a yellow phosphor are used in combination, and an excellent color reproduction type in which a blue LED chip that emits blue light, a green phosphor, and a red phosphor are used in combination. A white LED of the excellent color reproduction type uses βSiAlON as the green phosphor and uses a KSF phosphor (which is obtained by adding Mn to $K_2SiF_6$ crystal and which may be expressed by "$K_2SiF_6$: $Mn^{4+}$") as the red phosphor is widely used.

The KSF phosphor emits red light which has a narrow half-value width around 631 nm, but has a problem of long afterglow time. When a backlight device is driven by pulse width modulation (PWM), there is a problem that afterglow of the red light is observed when light is switched off. An effective solution to the problem of the afterglow of the KSF phosphor has not been found so far.

Particularly when a backlight device of the remote phosphor system performs partial drive (which may be called divided drive, area drive, or local dimming), a problem (here, called "color halo") that dark areas (e.g., portions diagonally above LEDs) around bright areas (e.g., portions immediately above the LEDs) are colored as compared to the bright areas is caused. According to Japanese Unexamined Patent Application Publication No. 2017-84761, the problem is able to be reduced by providing a dichroic mirror located between LEDs and a phosphor sheet that includes QDs. However, providing the dichroic mirror results in an increase of cost.

As the G-QD and the R-QD, a CdSe-QD is excellent in terms of color purity and light emission efficiency, and when a QD layer (e.g., a QD sheet) that contains 500 to 1500 ppm or more of Cd and a color filter having high color purity are used together, a color gamut of 90% or more of the Rec. 2020 color gamut is able to be achieved (e.g., Jian Chen et al., "Quantum Dots: Optimizing LCD Systems to Achieve Rec. 2020 Color Performance", SID 2015 Digest pp. 173-175 (2015)). However, Cd has high toxicity and a maximum allowable range of Cd is defined up to 100 ppm by RoHS Directive, for example. Although it is possible to achieve a wide color gamut (e.g., 90% of the Rec. 2020 color gamut) by using a QD layer containing 100 ppm or less of Cd and the color filter having high color purity, the color filter having high color purity has low light use efficiency, and thus luminance efficiency is significantly low.

The disclosure provides a backlight device that is able to achieve display of a color gamut of at least 70% of the Rec. 2020 color gamut, while suppressing reduction in luminance efficiency and reducing occurrence of color halo, by using, in combination with the backlight device, a color filter that has relatively low color purity and that supports, for example, Rec. 709, EBU, sRGB, or DCI-P3 a color gamut of which is narrower than the Rec. 2020 color gamut, and a liquid crystal display apparatus that includes the backlight device.

The disclosure provides a backlight device that reduces a problem of afterglow of red light in a white LED device including a KSF phosphor as a red phosphor, and a liquid crystal display apparatus that includes the backlight device.

SUMMARY

According to an embodiment of the disclosure, solutions described in the following items are provided.

Item 1

A backlight device includes: an LED substrate in which a plurality of LED devices are arrayed; and a quantum dot layer that is disposed to receive light output from the plurality of LED devices, in which each of the plurality of LED devices emits first blue light and at least one of first green light and first red light, when relative radiance of the first blue light is 1.00, relative radiance of the first green light is 0.21 or less and relative radiance of the first red light is 0.48 or less, the quantum dot layer includes, in accordance with the at least one of the first green light and the first red light, at least one of a green quantum dot that is excited by the first blue light and that emits second green light and a red quantum dot that is excited by the first blue light and that emits second red light, and the quantum dot layer contains 300 ppm or less of cadmium.

Item 2

The backlight device according to Item 1, in which each of the plurality of LED devices emits both the first green light and the first red light, and the quantum dot layer includes the green quantum dot that is excited by the first blue light and that emits the second green light and the red quantum dot that is excited by the first blue light and that emits the second red light.

Item 3

A backlight device includes an LED substrate in which a plurality of LED devices are arrayed; and a quantum dot layer that is disposed to receive light output from the plurality of LED devices, in which each of the plurality of LED devices emits first blue light, first green light, and first red light, each of the plurality of LED devices has a blue LED chip that emits the first blue light, a green phosphor that is excited by the first blue light and that emits the first green light, and a red phosphor that is excited by the first blue light and that emits the first red light, the red phosphor including KSF, the quantum dot layer includes a red quantum dot that is excited by the first blue light and that emits second red light, the quantum dot layer containing 300 ppm or less of cadmium, and a peak wavelength of the first red light is shorter than a peak wavelength of the second red light and the red quantum dot absorbs part of the first red light.

Item 4

A liquid crystal display apparatus includes: the backlight device according to Item 2; and a liquid crystal display panel that includes a color filter having color purity for Rec. 709 and that is disposed to receive light output from the backlight device, in which the liquid crystal display apparatus is able to perform display that covers a color gamut of at least 70% of Rec. 2020 color gamut.

DESCRIPTION OF THE EMBODIMENTS

Hereinafter, a backlight device 100 and a liquid crystal display apparatus 100D that includes the backlight device 100 according to the embodiment of the disclosure are described with reference to the drawings. Note that the backlight device and the liquid crystal display apparatus according to the embodiment of the disclosure are not limited to the exemplified ones. For example, a direct backlight device is exemplified below, but a similar effect is able to be exerted even when the disclosure is applied to an edge light backlight device.

Figure 1:
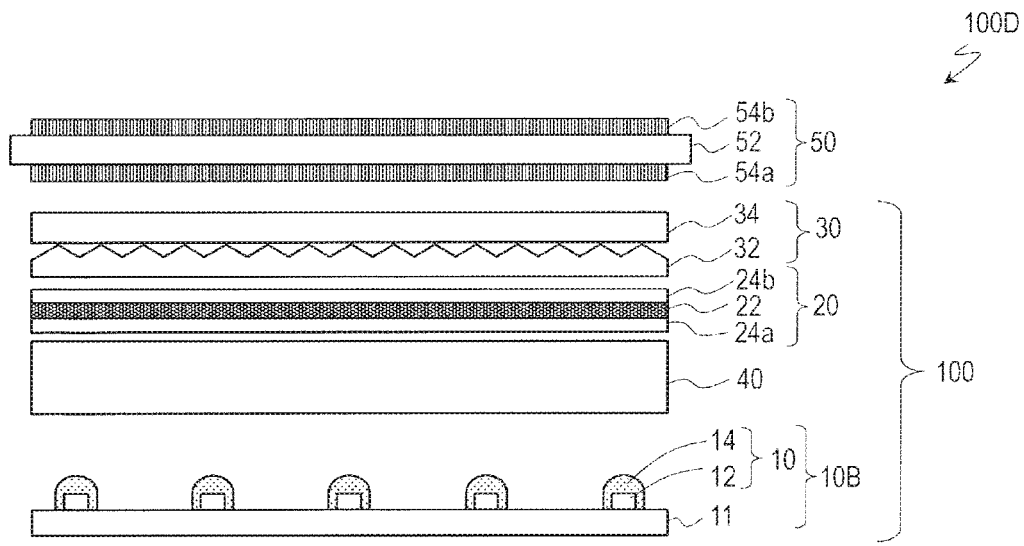
FIG. 1 is a schematic sectional view of a liquid crystal display apparatus according to an embodiment of the disclosure.

The liquid crystal display apparatus 100D illustrated in FIG. 1 includes the backlight device 100 and a liquid crystal display panel 50. The liquid crystal display panel 50 may be any known liquid crystal display panel. The liquid crystal display panel 50 has a liquid crystal cell 52 and two polarizing plates 54a and 54b that are disposed so as to face each other with the liquid crystal cell 52 located therebetween. The liquid crystal display panel 50 can further have various optical films, such as phase difference plates, disposed between the polarizing plates 54a and 54b and the liquid crystal cell 52. The liquid crystal cell 52 is provided with a color filter (not illustrated) having color purity for, for example, Rec. 709. When the color filter is used in combination with the backlight device 100, the liquid crystal display apparatus 100D is able to perform display that covers a color gamut of at least 70% of the Rec. 2020 color gamut. Since the liquid crystal display apparatus 100D uses the color filter having relatively low color purity for, for example, Rec. 709, luminance efficiency is not sacrificed.

The backlight device 100 has an LED substrate 10B in which a plurality of LED devices 10 are arrayed on a substrate 11, and a QD layer 22 that is disposed to receive light output from the plurality of LED devices 10. The backlight device 100 or the liquid crystal display apparatus 100D further includes a drive circuit (not illustrated) that drives the plurality of LED devices 10, and the drive circuit is able to perform partial drive or time-division drive of the plurality LED devices 10. Needless to say, the drive circuit is able to perform PWM drive of each of the plurality of LED devices 10.

Typically, the QD layer 22 is used as a QD sheet 20 that is interposed between protective sheets 24a and 24b. Each of the protective sheets 24a and 24b is made of, for example, a PET film. The QD layer 22 includes G-QDs that are excited by blue light and that emit green light (fluorescence) and R-QDs that are excited by blue light and that emit red light (fluorescence), and the QD layer 22 contains 100 ppm or less of cadmium.

The backlight device 100 optionally has a light diffusing layer 40 located between the LED substrate 10B and the QD layer 22 and optionally has an optical sheet laminate 30 on the light output side (that is, the side where the optical sheet laminate 30 is disposed so as to face the liquid crystal display panel 50) of the QD layer 22. As the light diffusing layer 40, for example, a light diffusing layer of a particle dispersed type in which particles whose refractive index is different from that of transparent resin are dispersed in the resin may be used. The optical sheet laminate 30 includes prism sheets 32 and 34 that are disposed such that ridge lines thereof are orthogonal to each other, for example. As the prism sheets 32 and 34, for example, BEF manufactured by 3M Company may be used. The optical sheet laminate 30 may further have a polarization-selecting reflective layer (not illustrated) on the light output side of the prism sheets 32 and 34. As the polarization-selecting reflective layer, for example, DBEF (registered trademark) manufactured by 3M Company may be used.

The backlight device 100 does not have a wavelength-selecting reflective layer (e.g., a dichroic mirror), which has a transmittance to excitation light (first blue light) higher than to fluorescence (second green light and second red light), between the QD layer 22 and the LED substrate 10B. As described later, without providing the wavelength-selecting reflective layer, it is possible to reduce occurrence of color halo.

Figure 2:
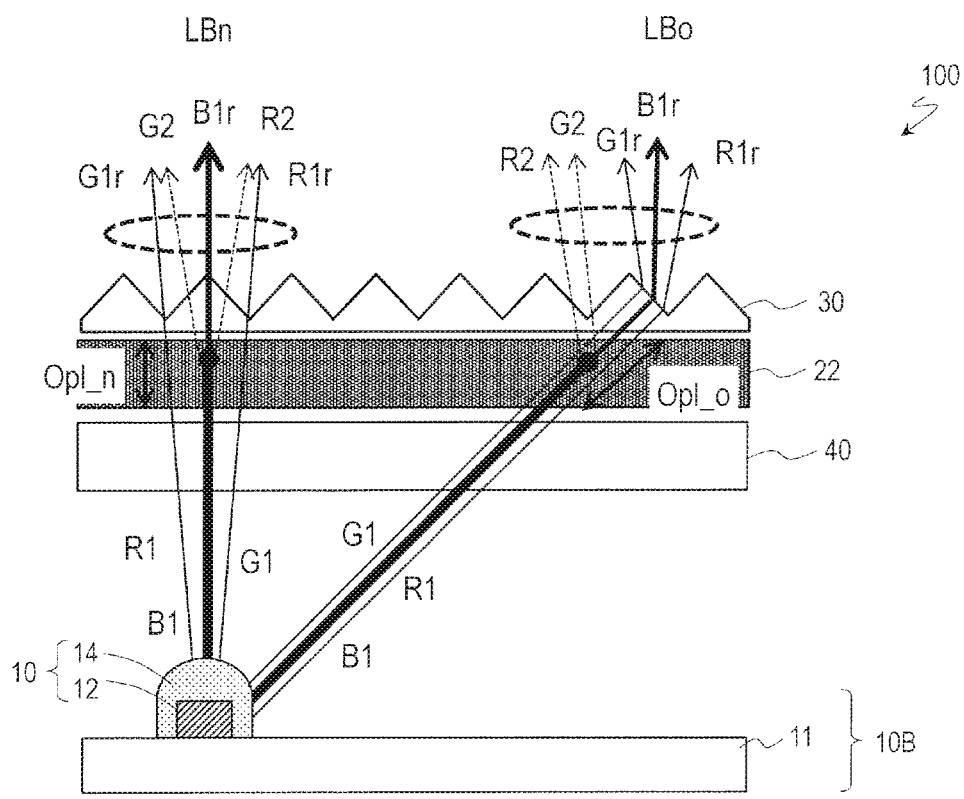
FIG. 2 is a schematic sectional view for explaining a configuration and a function of a backlight device according to the embodiment of the disclosure.

As illustrated in FIG. 2, each of the plurality of LED devices 10 emits first blue light B1, first green light G1, and first red light R1. At this time, when the relative radiance of the first blue light B1 is 1.00, the relative radiance of the first green light G1 is 0.21 or less and the relative radiance of the first red light R1 is 0.48 or less, and, for example, the relative radiance of the first green light G1 is adjusted to 0.18 or less and the relative radiance of the first red light R1 is adjusted to 0.42 or less. The relative radiance of each of the first blue light B1, the first green light G1, and the first red light R1 can be adjusted in accordance with light emission efficiency (wavelength conversion efficiency) of the QD layer, a spectral transmittance of the color filter, or the like. However, the relative radiance of the first green light G1 is desirably 0.09 or more and the relative radiance of the first red light R1 is desirably 0.21 or more. This is because when the first green light G1 and/or the first red light R1 are/is excessively weak, it is difficult to obtain a sufficient effect of suppressing the color halo. When the first green light G1 and/or the first red light R1 are/is excessively strong, a desired color gamut may not be obtained. Moreover, when the first red light R1 is excessively strong, a problem of afterglow of red light may be caused.

Note that, in a white LED device which is used in a backlight device according to the related art and in which a blue LED and a phosphor are used in combination, when the relative radiance of blue light is 1.0, the relative radiance of green light is about 0.3 and the relative radiance of red light is about 0.7. On the other hand, in the LED device 10 of the backlight device of the embodiment of the disclosure, the relative radiance of each of green light and red light is low such that, when the relative radiance of the first blue light B1 is 1.00, the relative radiance of the first green light G1 is 0.21 or less and the relative radiance of the first red light R1 is 0.48 or less. Accordingly, the LED device 10 outputs bluish white light. Thus, in the present specification, the LED device 10 may be referred to as BW-LED.

Each of the plurality of LED devices 10 has a blue LED chip 12 that emits the first blue light B1, and a phosphor 14 that is excited by the first blue light B1. Here, the phosphor 14 includes a green phosphor 14 that emits the first green light G1 and a red phosphor 14 that is excited by the first blue light B1 and that emits the first red light R1. The green phosphor 14 and the red phosphor 14 can be provided in the LED device 10 in known various forms.

The red phosphor 14 desirably includes, for example, KSF. The KSF has a light emission peak wavelength around 631 nm, has a narrow half-value width (full width at half maximum: FWHM) of about 10 nm, and has high color purity. The green phosphor desirably includes, for example, βSiAlON. The βSiAlON has a light emission peak wavelength around 540 nm, has a narrow half-value width of about 40 nm, and has high color purity. Note that, in the specification, the light emission peak wavelength is represented by a three-digit numerical value in accordance with common practice, which does not mean that the significant figures are three-digit numbers. Each of the light emission peak wavelengths allows deviation of ±2 nm. The light emission peak wavelength of the KSF is 631 nm, but may be, for example, 629 nm or more and 633 nm or less.

Figure 3:
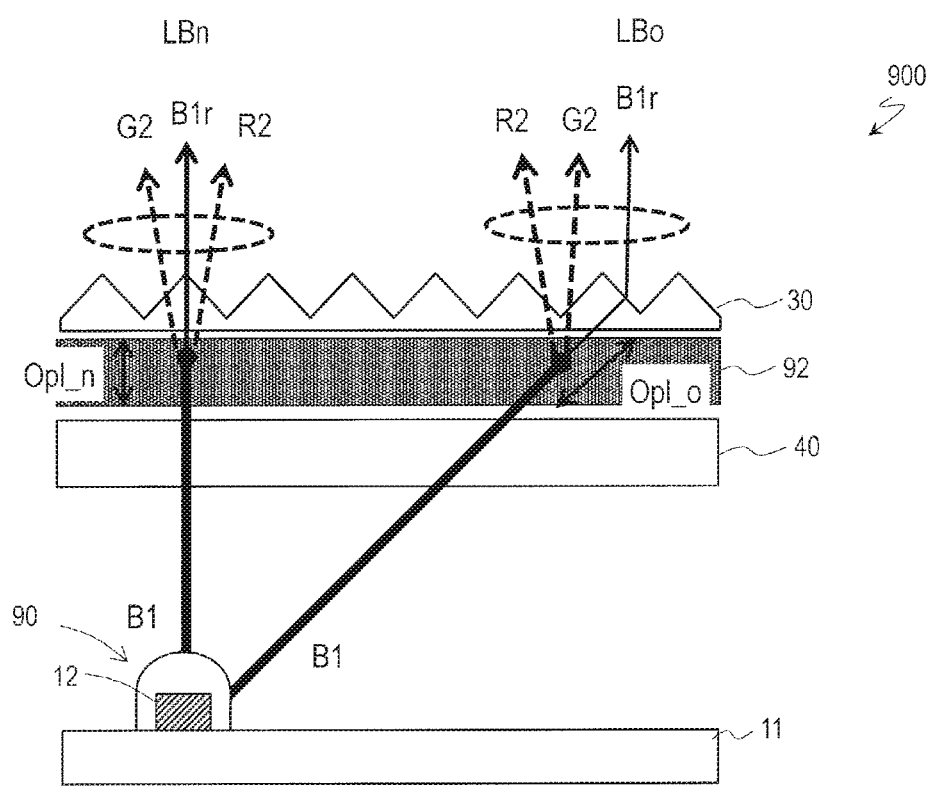
FIG. 3 is a schematic sectional view for explaining a mechanism of color halo occurring in a backlight device according to the related art.

Next, with reference to FIGS. 2 and 3, the reason why the backlight device 100 according to the embodiment of the disclosure is able to reduce the problem of the color halo more effectively than a backlight device including a dichroic mirror is described.

First, a mechanism of the color halo occurring in a backlight device 900 according to the related art is described with reference to FIG. 3. Note that, in FIG. 3, components having the same functions as those of components illustrated in FIGS. 1 and 2 are given the same reference signs and description thereof is omitted.

An LED device 90 of the backlight device 900 according to the related art emits only blue light B1 that excites G-QDs and R-QDs that are included in a QD layer 92. That is, the LED device 90 has only a blue LED chip 12, which emits the blue light B1, and has no phosphor. The QD layer 92 contains several hundreds ppm or more of Cd, and receives the blue light B1 to emit green light (fluorescence) G2 and red light (fluorescence) R2. The backlight device 900 outputs the green light G2, the red light R2, and blue light B1r that is transmitted through the QD layer 92, and such color light is used for display.

The amount (number) of G-QDs and R-QDs that are excited by the blue light B1 depends on an optical path length of the blue light B1 that passes through the QD layer 92. As illustrated in FIG. 3, for example, an optical path length Opl_o of blue light that passes through the QD layer 92 at a position diagonally above the LED device 90 is longer than an optical path length Opl_n of blue light B1 that passes through the QD layer 92 at a position immediately above the LED device 90. Accordingly, for example, when blue light B1r, green light G2, and red light R2 that are included in a light beam LBn that is output from the QD layer 92 at the position immediately above the LED device 90 are adjusted to represent a desired white color, blue light B1r that is included in a light beam LBo output from the QD layer 92 at the position diagonally above the LED device 90 is weak, and green light G2 and red light R2 that are included in the light beam LBo are strong, and thus the light beam LBo becomes yellowish in color. As a result, particularly when the backlight device 900 performs partial drive, the color halo occurs markedly.

On the other hand, as illustrated in FIG. 2, the backlight device 100 according to the embodiment of the disclosure displays green color and red color by utilizing not only second green light G2 and second red light R2 that are emitted by the QD layer 22 but also first green light G1r and first red light R1r which are transmitted through the QD layer 22 among the first green light G1 and the second red light R1 that are emitted by the LED device 10. Thus, the concentration of QDs that are included in the QD layer 22 is lower than the concentration of QDs that are included in the QD layer 92 of the backlight device 900 according to the related art and can be, for example, 100 ppm or less. Accordingly, a difference in intensity of first blue light B1r, the second green light G2, and the second red light R2, which is caused by a difference in optical path length of the first blue light B1 that passes through the QD layer 22 in the backlight device 100, is smaller than a difference in intensity of the blue light B1r, the second green light G2, and the second red light R2, which is caused by a difference in optical path length of the blue light B1 that passes through the QD layer 92 in the backlight device 900. As a result, the backlight device 100 according to the embodiment of the disclosure is able to reduce occurrence of the color halo more than the backlight device 900 according to the related art, and a dichroic mirror can be omitted.

The example in which the QD layer 22 emits green light and red light has been described above, but needless to say, even when an LED device that emits color light, which corresponds to the color light emitted by the QD layer 22 is used, by using a QD layer that emits one of green light and red light as the QD layer 22, the color halo for the corresponding color is able to be suppressed. For example, when an LED device emits first blue light and first green light, a quantum dot layer may include a green quantum dot that is excited by the first blue light and that emits second green light.

Moreover, the KSF is suitably used as the red phosphor 14 of the LED device 10 of the backlight device 100 and the first red light R1r emitted by the KSF is used for display. As indicated by a specific example described later, however, a problem of afterglow of the red light R1r is not caused. A peak wavelength (e.g., 631 nm) of the first red light R1 emitted by the KSF phosphor is shorter than a peak wavelength (e.g., 640 nm) of the second red light emitted by the R-QD, and the R-QD absorbs part of the first red light R1. Accordingly, the red light emitted by the backlight device 100 includes the first red light R1r that is part of the first red light R1 and the second red light R2, and a time to attenuate the entire intensity of the first red light R1r and the second red light R2 to one-tenth of the initial value is shorter than 10 msec. As a result, it is considered that the problem of the afterglow of the red light R1r is not caused.

Next, features of the backlight device and the liquid crystal display apparatus that includes the backlight device according to the embodiment of the disclosure are described according to the specific examples.

Configurations and performance of backlight devices and liquid crystal display apparatuses of Comparative examples 1 to 3 and Examples 1 to 3 are collectively shown in Table 1 described below.

Here, blue LED chips used in LED devices of Comparative examples 1 to 3 and Examples 1 to 3 are of the same type and have a light emission peak wavelength of 445 nm and a half-value width of 22 nm. A green phosphor (βSiAlON) has a light emission peak wavelength of 535 nm and a half-value width of 45 nm, and a red phosphor (KSF) has a light emission peak wavelength of 632 nm and a half-value width of 11 nm. Regarding relative radiance of BW-LEDs of Examples 1 to 3, when the relative radiance of blue light is 1.00, the relative radiance of green light is 0.174 and the relative radiance of red light is 0.410.

Each of G-QDs and R-QDs that are used has a light emission peak wavelength and a half-value width as follows. Wavelength values in Table 1 are different from the following values (actually measured values), but a difference therebetween is within the deviation (±2 nm).

Light emission characteristics of the QDs are as follows.

Comparative Example 3 and Examples 1 and 2

The G-QD has the light emission peak wavelength of 533 nm and the half-value width of 34 nm.

The R-QD has the light emission peak wavelength of 631 nm and the half-value width of 28 nm.

Example 3

The G-QD has the light emission peak wavelength of 533 nm and the half-value width of 34 nm.

The R-QD has the light emission peak wavelength of 639 nm and the half-value width of 28 nm.

supports DCI-P3 are used in combination, a liquid crystal display apparatus that covers a color gamut of 93% to 99% of the DCI-P3 color gamut is able to be constituted, but the color gamut is only 68% to 70% of the Rec. 2020 color gamut. In addition, the time to attenuate afterglow of red light (time to attenuate afterglow from the initial value of 100% to 10%; the same applies hereinafter) due to KSF is 14 msec that is long, and afterglow of red light is visually confirmed. Note that, by using a value of luminance efficiency of the liquid crystal display apparatus of Comparative example 1 as a reference value of the luminance efficiency, luminance efficiency of the other liquid crystal display apparatuses is given.

In Comparative example 2, a color gamut of 91% of the Rec. 2020 color gamut is covered by using a blue LED (B-LED) and a quantum dot (QD) in combination and further using a color filter that has high color purity and that supports Rec. 2020. Note that, a QD layer that contains, as the R-QD, 600 ppm of CdSe with a peak wavelength of 640 nm is used to obtain a larger color gamut. The color gamut of the liquid crystal display apparatus of Comparative example 2 is sufficient, but the color filter having high color purity is used, and thereby the luminance efficiency is lowered to 65% of that of the liquid crystal display apparatus of Comparative example 1. Furthermore, occurrence of the color halo is confirmed. Note that KSF is not used and thus afterglow of red light is not generated.

In Comparative example 3, a blue LED (B-LED) and a quantum dot (QD) are used in combination and a color filter that supports DCI-P3 is used as the color filter. As a result,

TABLE 1

|  | Comparative example 1 | Comparative example 2 | Comparative example 3 | Example 1 | Example 2 | Example 3 |
| --- | --- | --- | --- | --- | --- | --- |
| Feature of configuration | W-LED | B-LED + QD with much Cd | B-LED + QD with much Cd | BW-LED + QD with much Cd | BW-LED + QD with 100 ppm or less of Cd | BW-LED + QD with 100 ppm or less of Cd |
| Color filter | DCI-P3 support | Rec. 2020 support | DCI-P3 support | DCI-P3 support | DCI-P3 support | DCI-P3 support |
| Coverage of Rec. 2020 | 68 to 70% | 91% | 76% | — | 71% | 75% |
| Luminance efficiency (nt/W) Relative proportion | 3.522 100% | 2.314 65% | 77% | — | 92% | >90% |
| LED | W-LED | B-LED | B-LED | BW-LED | BW-LED | BW-LED |
| Phosphor R | KSF 631 nm | — | — | KSF 631 nm | KSF 631 nm | KSF 631 nm |
| Phosphor G | βSiAlON 535 nm | — | — | βSiAlON 535 nm | βSiAlON 535 nm | βSiAlON 535 nm |
| R-QD | — | CdSe 640 nm | CdSe 631 nm | CdSe 631 nm | CdSe 631 nm | CdSe 640 nm |
| G-QD | — | CdSe | CdSe | CdSe | CdSe | CdSe |
| Cd content | (0 ppm) | 600 ppm | 300 ppm | 300 ppm | 100 ppm | 100 ppm |
| color halo | No | Yes | Yes | No | No | No |
| Time to attenuate afterglow of red light | 14 msec | 0 msec | 0 msec | 7.9 msec | — | 8.8 msec |
| Afterglow of red light visually confirmed | Yes | No | No | No | — | No |

The backlight device of Comparative example 1 uses a white LED (W-LED) of the excellent color reproduction type according to the related art in which a blue LED chip that emits blue light, a green phosphor, and a red phosphor are used in combination. When the backlight device and a liquid crystal display panel including a color filter that the color gamut is narrowed to 76% of the Rec. 2020 color gamut, but the luminance efficiency is improved to 77% of that of the liquid crystal display apparatus of Comparative example 1. Although the QD layer contains 300 ppm of Cd, the color halo occurs. Note that the color gamut is 76% of the Rec. 2020 color gamut, but as compared to the liquid crystal display apparatus of Comparative example 1, the color display characteristics are improved. The time to attenuate afterglow of red light is 0 msec, the red light (R2) emitted from the QD layer quickly attenuates, and generation of afterglow of red light is not confirmed.

In the backlight device of Example 1, the aforementioned BW-LED is used and the QD layer that contains 300 ppm of Cd is used. As a result of using the BW-LED, occurrence of the color halo is not confirmed, and as a result of using the QD layer, the time to attenuate afterglow of red light due to KSF is as short as 7.9 msec, and afterglow of red light is not visually confirmed.

In the backlight device of Example 2, as a result of reducing the Cd content in the QD layer to 100 ppm compared to the backlight device of Example 1 and utilizing green light and red light that are emitted by the BW-LED, the luminance efficiency of the liquid crystal display apparatus of Example 2 is improved to 92% of that of the liquid crystal display apparatus of Comparative example 1. Moreover, similarly to Examples 1 and 3, the BW-LED is used and therefore the color halo does not occur, and since the QD layer is used, afterglow of red light is not visually confirmed. The Cd content in the QD layer is 100 ppm, satisfying a requirement of RoHS Directive. However, a color gamut is only 71% of the Rec. 2020 color gamut, and the color display characteristics are not sufficiently improved compared to the liquid crystal display apparatus of Comparative example 1.

In the backlight device of Example 3, by changing the light emission peak wavelength of the R-QD in the QD layer of the backlight device of Example 2 from 631 nm to 640 nm, the color gamut of the liquid crystal display apparatus of Example 3 is improved to 75% of the Rec. 2020 color gamut, and as a result, the color display characteristics are improved compared to the liquid crystal display apparatus of the Comparative example 1. Occurrence of the color halo is not confirmed in the liquid crystal display apparatus of Example 3, the time to attenuate afterglow of red light due to KSF is as short as 8.8 msec, and thus afterglow of red light is not visually confirmed. Similarly to Example 2, the Cd content in the QD layer is 100 ppm, satisfying the requirement of RoHS Directive.

Note that, as described above, an effect of reducing afterglow of red light emitted by a KSF phosphor by using a QD layer is exerted in an LED device including the KSF phosphor. That is, according to another embodiment of the disclosure, a backlight device that reduces the problem of afterglow of red light in the LED device including the KSF phosphor as a red phosphor is able to be provided.

The embodiment of the disclosure is applicable to a backlight device suitably used for a liquid crystal display apparatus, and a liquid crystal display apparatus that includes the backlight device.

The present disclosure contains subject matter related to that disclosed in Japanese Priority Patent Application JP 2019-192226 filed in the Japan Patent Office on Oct. 21, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A backlight device comprising:
an LED substrate in which a plurality of LED devices are arrayed; and
a quantum dot layer that is disposed to receive light output from the plurality of LED devices, wherein
each of the plurality of LED devices emits first blue light and at least one of first green light and first red light,
when relative radiance of the first blue light is 1.00, relative radiance of the first green light is 0.21 or less and relative radiance of the first red light is 0.48 or less,
the quantum dot layer includes, in accordance with the at least one of the first green light and the first red light, at least one of a green quantum dot that is excited by the first blue light and that emits second green light and a red quantum dot that is excited by the first blue light and that emits second red light, and the quantum dot layer contains 300 ppm or less of cadmium.

2. The backlight device according to claim 1, wherein
each of the plurality of LED devices emits both the first green light and the first red light, and
the quantum dot layer includes the green quantum dot that is excited by the first blue light and that emits the second green light and the red quantum dot that is excited by the first blue light and that emits the second red light.

3. The backlight device according to claim 2, wherein each of the plurality of LED devices includes a blue LED chip that emits the first blue light, a green phosphor that is excited by the first blue light and that emits the first green light, and a red phosphor that is excited by the first blue light and that emits the first red light.

4. The backlight device according to claim 3, wherein the red phosphor includes KSF.

5. The backlight device according to claim 3, wherein the green phosphor includes βSiAlON.

6. The backlight device according to claim 2, further comprising
a drive circuit that drives the plurality of LED devices, wherein
the drive circuit is able to perform partial drive of the plurality of LED devices.

7. The backlight device according to claim 6, wherein the drive circuit is able to perform PWM drive of each of the plurality of LED devices.

8. The backlight device according to claim 2, wherein
a wavelength-selecting reflective layer that has a transmittance to the first blue light higher than to the second green light and to the second red light is not provided between the quantum dot layer and the LED substrate.

9. The backlight device according to claim 2, wherein the quantum dot layer contains 100 ppm or less of cadmium.

10. A backlight device comprising:
an LED substrate in which a plurality of LED devices are arrayed; and
a quantum dot layer that is disposed to receive light output from the plurality of LED devices, wherein
each of the plurality of LED devices emits first blue light, first green light, and first red light,
each of the plurality of LED devices has a blue LED chip that emits the first blue light, a green phosphor that is excited by the first blue light and that emits the first green light, and a red phosphor that is excited by the first blue light and that emits the first red light, the red phosphor including KSF,
the quantum dot layer includes a red quantum dot that is excited by the first blue light and that emits second red light, the quantum dot layer containing 300 ppm or less of cadmium, and a peak wavelength of the first red light is shorter than a peak wavelength of the second red light and the red quantum dot absorbs part of the first red light.

11. The backlight device according to claim 10, wherein a time to attenuate entire intensity of the first red light and the second red light to one-tenth of an initial value is shorter than 10 msec.

12. The backlight device according to claim 10, further comprising
a drive circuit that drives the plurality of LED devices, wherein
the drive circuit is able to perform PWM drive of each of the plurality of LED devices.

13. A liquid crystal display apparatus comprising:
the backlight device according to claim 2; and
a liquid crystal display panel that includes a color filter having color purity for Rec. 709 and that is disposed to receive light output from the backlight device, wherein
the liquid crystal display apparatus is able to perform display that covers a color gamut of at least 70% of Rec. 2020 color gamut.

* * * * *